May 19, 1925.　　　　　　　　　　　　　　　　　　　1,538,736
H. C. ODEN
MILKING MACHINE
Original Filed March 10, 1921　　3 Sheets-Sheet 1

HENRY CLYDE ODEN
INVENTOR.

BY

ATTORNEY.

May 19, 1925.

H. C. ODEN

MILKING MACHINE

Original Filed March 10, 1921    3 Sheets-Sheet 2

1,538,736

HENRY CLYDE ODEN
INVENTOR.

BY
ATTORNEY.

May 19, 1925.  1,538,736
H. C. ODEN
MILKING MACHINE
Original Filed March 10, 1921    3 Sheets-Sheet 3

HENRY CLYDE ODEN
INVENTOR.

BY

ATTORNEY.

Patented May 19, 1925.

1,538,736

UNITED STATES PATENT OFFICE.

HENRY CLYDE ODEN, OF COLUMBUS, OHIO, ASSIGNOR TO PINE TREE MILKING MACHINE COMPANY, OF CHICAGO, ILLINOIS, A CORPORATION OF ILLINOIS.

MILKING MACHINE.

Original application filed March 10, 1921, Serial No. 451,252. Divided and this application filed September 6, 1924. Serial No. 736,365.

*To all whom it may concern:*

Be it known that I, HENRY CLYDE ODEN, a citizen of the United States, residing at Columbus, Ohio, in the county of Franklin and State of Ohio, have invented new and useful Improvements in Milking Machines, of which the following is a specification.

My invention relates to milking machines and aims to provide a milking machine whose essential parts are so constructed as to reduce the cost of manufacture to a minimum and to eliminate many difficulties hitherto attendant upon the practical application and operation of the various parts. It comprises a number of features which result in compactness and yet which lower the cost of manufacture and facilitate the various operations which are necessary to place and maintain a milking machine in practical use from day to day.

One of the features of my novel milking machine is that it is provided with a novel form of oscillating valve for controlling the operation of the pulsator. This oscillating valve is of such a structure that it is not carried by any element but merely lays on its seat and is designed to swing about a post passing through it adjacent its rear end. The valve will be held to its seat by vacuum but is moved to alternate positions by means of a trip arm which is so mounted that it will be balanced against all tendency to exert pressure downwardly upon the oscillating valve. As a matter of fact, the structure is such that the valve will be oscillated and will be entirely free from any pressure whatsoever excepting such as may be necessary to effect the oscillation, the result being that a uniform and even contact is maintained between the valve and its seat.

Another highly advantageous feature of my invention arises from the provision of a slidable and rotatable valve for controlling the application of vacuum to effect the pulsations of the teat cups. The result of this slidable and rotatable valve construction is that any dirt creeping into the space between the valve and its seat will be automatically eliminated by the centrifugal action of the valve when it strikes such a particle of dirt and in consequence thereof is given a rotation upon its seat.

A further feature of my apparatus has to do with the provision of a novel form of locking collar construction for effecting an air-tight connection between the pulsator and the top of the pail on which the pulsator is mounted. In my construction of milking machine, the milk pail cover is provided with an aperture upon which is superimposed an open-bottomed chamber carried by the pulsator element and designed to retain a ball check valve which normally rests upon this aperture and controls the same. I have provided a quick detachable connection between this chamber element and the pail cover in the form of a collar which, upon rotation, simultaneously locks the pulsator member to the pail cover and draws the same into air-tight relation thereto.

There is a still further feature that is highly advantageous and that arises from the provision of a hollow screw construction whereby the vacuum is applied to both ends of the pulsator. This construction is such that the opposed cylinders of the pulsator may be each made from one piece with a consequently great saving in labor and cost of production and with a greatly increased longevity as well as a minimum cost of repair.

Other features of advantage will appear as this description progresses.

The preferred embodiment of this invention is shown in the accompanying drawings wherein similar characters of reference designate corresponding parts and wherein.

Figure 6:
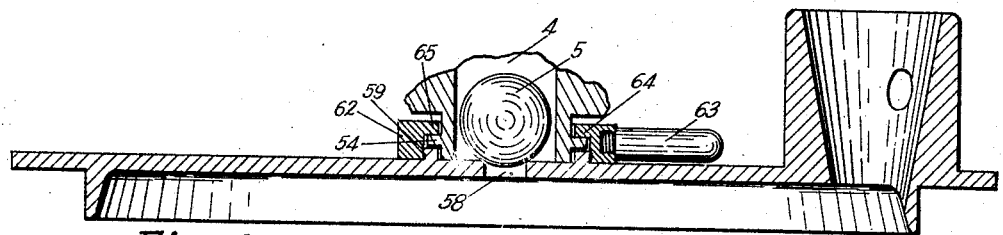
Figure 6 is a transverse section of my pail cover and showing the locking collar clamping the chamber element of the pulsator member in air-tight relation to the cover.

In the drawings, the pulsator is shown as comprising a pulsator block 1 with a main vacuum passage 2 extending through a nipple 3 and leading into a main vacuum chamber 4 which is designed to house a ball check valve 5, as in Figure 6. Leading off from the chamber 4 is a branch vacuum passage 6 that is alternately placed in connection with passages 7 and 8 which respectively lead to conduits 9 and 10 communicating with the pulsating chambers of teat cups not shown. This alternate connection of the passages 7 and 8 with the passage 6 is effected by a circular slide valve 11 that is so mounted and so connected to an impelling means that in the event of any dirt or extraneous material creeping in between the valve and its seat, this valve will be capable of sufficient rotation during the course of its movement to expel this dirt or extraneous material by a centrifugal action.

Leading from the main vacuum passage 2 there is also provided a branch vacuum conduit 12 which is under the control of a needle valve 13 threaded as at 14 and having a knurled head 15. In between the knurled head and the pulsator block is a washer 16 against which bears a coil spring 17 that bears at its opposite end against the knurled head 15. This spring effects a locking action upon the needle valve so that it will remain in any position to which it is adjusted.

The conduit 12 is alternately connected with passages 18 and 19 by means of a valve 20 which is mounted upon and designed to swing about a post 21. These passages 18 and 19 respectively lead to the opposite end of the pulsator cylinders by hollow screws and the housings therefor which will be subsequently described.

The cylinders of the pulsator are of an extremely simple construction because they are each made from a single piece of material. In the drawings, they are designated 22 and 23. Each cylinder is held to the pulsator block on one side by a threaded bolt 24 and on the other side by a hollow screw 25. The threaded bolts 24 pass through integral flanges 26. Operating within each cylinder is a piston head 27 and these piston heads are connected together by a lock rod 28.

The extremely simple construction described is made possible by the provision of the hollow screws 25 which are threaded at 29 and provided with passages 30 and 31 that communicate with the passages 18 and 19. The threads 29 of the hollow screw are designed to screw into the internally threaded sockets 32 of the pulsator block and since these sockets 32 are intercepted by the passages 18 and 19, the hollow screws serve to assist in holding the cylinders 22 and 23 in position and to provide a means of communication of the passages 18 and 19 to the cylinder interior. This communication is rendered complete by the fact that the bores through which the hollow screws extend are of a larger diameter than the shanks of the screws and communicate adjacent their outermost ends with the cylinder interiors by means of passages 33. It will be apparent that the vacuum thus becomes effective upon the pulsator pistons by way of the passages 18 or 19, passages through the screws which are designated 30 and 31, the bores which may be designated 34 and the ports 33 leading into each cylinder adjacent its end.

The oscillating valve 20 is provided with an upstanding pin 35 upon its upper surface and this upstanding pin fits very loosely into an aperture 36 in a trip arm 37 that is likewise mounted upon the post 21. These members 21 and 37 are held in position upon this post 21 by means of a washer 38 and a nut 39. The trip arm 37 extends rearwardly beyond the post and carries an upstanding pin 40 having an annular groove adjacent its upper end for the reception of one end of a coil spring 41. The forward end of the trip arm overlaps a bearing plate on the lock rod, this bearing plate desirably forming a part of such lock rod and being designated 42. At this point it may be well to state that the coil spring 41, in addition to its regular function, has a tendency to lift the rear end of the trip arm and thus prevent binding of this arm upon the oscillating valve 20. In conjunction with this, the bearing plate 42 supports the forward end of the trip arm and ensures that this forward end will exert no downward pressure upon the oscillating valve 20. The combined result of this construction is that the oscillating valve is rendered absolutely free of any pressure either downward or upward and the vacuum is freely effective to hold the valve in even position upon its seat.

Figure 1:
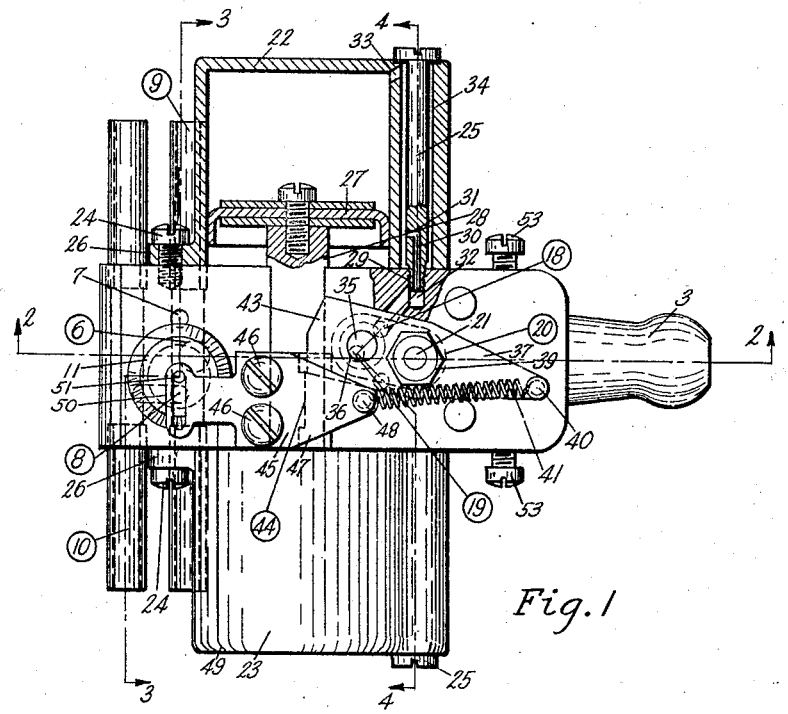
Figure 1 is a plan view, partially in section, of what I have termed my pulsator element, with the cover removed.
Figure 2:
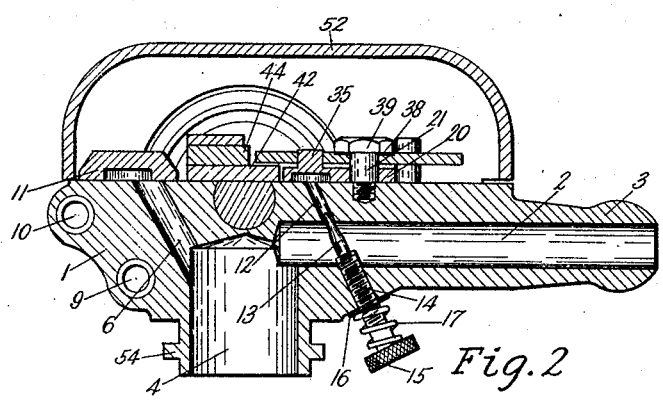
Figure 2 is a section taken on line 2—2 of Figure 1, with the exception that it shows the cover plate in position.
Figure 3:
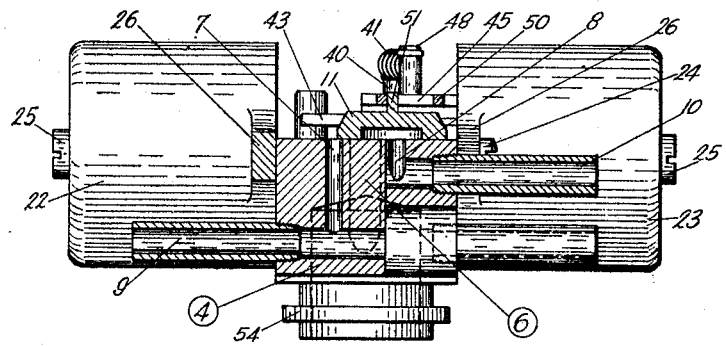
Figure 3 is a section taken on line 3—3 of Figure 1.
Figure 4:
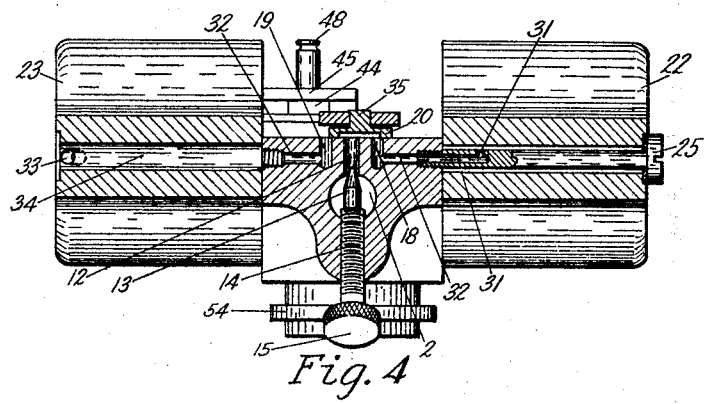
Figure 4 is a section taken on line 4—4 of Figure 1.

The forward end of the trip arm is of angular form as shown at 43 in Figure 1 and this angular end cooperates with the locking piece 44. Mounted upon the locking piece is a pulsation valve arm 45 held in place by screws 46 and having a rear extension 47 carrying a pin 48. This pin 48 has an annular groove adjacent its upper end in which fits the forward end of the spring 41. In operation, the movement of the piston element and the locking rod into a new position will cause a gradual tensioning of the spring 41 but the trip arm will be held in the same position by means of the lock 44 until the spring passes center. Immediately after this spring passes center, the trip arm snaps over into its new position.

The forward end of the pulsation valve arm has a shank 49 and a slotted head 50.

Into the slot of this head 50 extends an upstanding pin 51 centrally mounted on the valve 11. The obvious result is that as the piston moves away from the position it is in toward its opposite position it brings about both an oscillation of the valve 20 and a sliding movement of the valve 11 for the purpose of connecting the various passages in the manner already indicated. It will be noted that the slot in the head 50 permits of a certain amount of lost motion and it also facilitates the rotation of the valve 11 whenever this becomes necessary.

The pulsator member is desirably provided with a cover plate 52 that fits over and protects the valve structure from dirt or extraneous material of any kind. The forward end of this cover plate is provided with bifurcate lugs (not shown) which fit over and are clamped in place by screw bolts 53.

Figure 5:
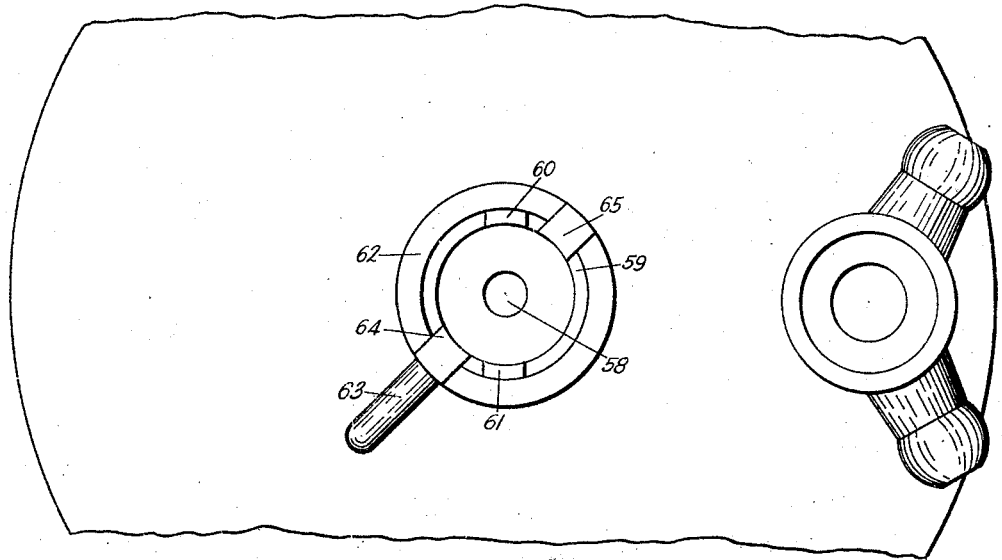
Figure 5 is a plan view of my pail cover showing the locking collar mounted thereon and the pulsator element removed.
Figure 7:
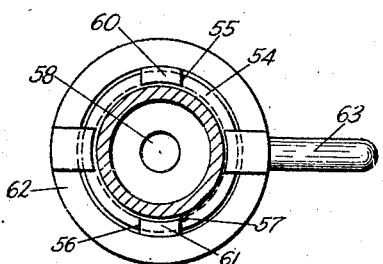
Figure 7 is a bottom plan view showing the chamber element of the pulsator member together with the locking flanges and the stop pin carried thereby.

The manner of attaching the pulsator to the pail cover is shown best in Figures 5, 6 and 7 and consists in providing the lower end of the chamber 4 with an exterior flange 54 that is cut away as at 55 and 56. There is also mounted in this flange a vertical stop pin 57. Extending upwardly from the pail cover and in concentric relation to the aperture 58 therein is an externally threaded wall 59 of circular form and carrying upstanding shoulders 60 and 61 which are designed to fit into the cutaway portions 55 and 56 of the flange member 54. There is also provided a collar 62 having a handle 63 extending radially therefrom and provided with internal screw threads for coaction with the screw threads 59. This collar is also provided with inwardly projecting lugs 64 and 65 which are designed to pass through the cutaway portions 55 and 56 so that upon rotation of the collar the pulsator member will be locked to the pail cover. In operation, the ring is placed in position and partially screwed down upon the threads of the wall 59 and then the inwardly extending lugs 64 and 65 are caused to register with the lugs 60 and 61 upon this upstanding wall 59. Then the pulsator element is placed in position so that the lugs 60 and 61 and the lugs 64 and 65 will pass upwardly through the cutaway portions 55 and 56 of the flange 54. As soon as this is effected, a rotation of the collar 62 will simultaneously lock the pulsator to the lid and draw the lower end of the chamber 4 into air-tight relation with the valve seat. The pin 57 provides a stop for determining the proper position of the collar when the pulsator is to be applied to the pail lid and after the pulsator is applied, this pin ensures that the rotation of the collar will be in the proper direction to bring about a locking of the pulsator into air-tight relation to the pail lid.

It is important to note that in the structure of milking machine described herein, the removal of the pulsator from the lid is effected by the simplest possible operation and that the operation of removing the pulsator from the lid immediately exposes the check valve and the interior of its housing for the purpose of cleansing, this exposure of the check valve and the housing parts being brought about absolutely without the necessity for any other operation than the mere removal of the pulsator from the pail lid.

Having thus described my invention, what I claim is:

1. In a milking machine, a valve structure comprising a valve held to its seat by vacuum, and an operating arm supported at its front and rear by means independent of said valve and positioned above the valve seat.

2. In a milking machine, a pivoted valve structure comprising a valve held to its seat by vacuum, an operating arm mounted upon the valve pivot and a supporting shelf in front of said valve upon which said operating arm bears to prevent the application of pressure by said operating arm on said valve.

3. In a milking machine, a valve structure comprising a valve held to its seat by vacuum, an operating arm for said valve, a shelf forming a bearing for the front end of said operating arm and means exerting a lifting tendency upon the rear end of said operating arm.

4. In a milking machine, a valve structure comprising a valve held to its seat by vacuum, an operating arm, a shelf serving as a bearing for the forward end of said operating arm and means of a resilient nature for exerting a lifting tendency upon the rear end of said operating arm.

5. In a milking machine, a valve structure comprising a valve held to its seat by vacuum, an operating arm for said valve, a pin on the top of said valve extending loosely into an aperture in said operating arm, and means for preventing downward movement of either end of said operating arm.

6. In a milking machine, a valve structure comprising a valve held to its seat by vacuum, a trip arm for moving said valve into alternative positions, a lock rod, a supporting shelf for the front end of said trip arm, and a coil spring for moving said trip arm when it passes center, said coil spring being so connected to the rear end of said trip arm that it will apply a lifting tension thereto.

7. In a milking machine, a valve structure comprising a valve held to its seat by vacuum, a post about which said valve is adapted to swing, an operating arm mounted on said post, a pin on said valve and extending loosely into an aperture in said operating arm, means for supporting said operating arm forward of the post and means for supporting said operating arm in the rear of said post.

8. In a milking machine, a valve held to its seat by vacuum, an operating arm for said valve and a support for the forward end of said operating arm, a reciprocating lock rod carrying said supporting shelf.

9. In a milking machine, a valve structure comprising a slidable rotatable valve and means contacting only with the upper surface of said valve for actuating same.

10. In a milking machine, a valve structure comprising a valve capable of alternately connecting either two of three passages, means upon the upper surface of said valve by which said valve is actuated, a valve seat provided with three passages therein, said valve being rotatable but being of such a construction that regardless of the position to which it is rotated it will always be capable of bridging any two adjacent passages.

11. In a milking machine, a valve construction comprising two slidable valves, reciprocating piston heads and a connecting rod therefor, a member connected to the rod which connects the reciprocating piston heads for directly operating one of said valves, a trip arm for operating the other of said valves, and a tension spring connected to said member which operates said first valve.

12. In a milking machine, a lid having an opening therein, a pulsator element having an open-bottomed vacuum chamber for superimposition upon and enclosure of the opening in said lid, a flange on said vacuum chamber and provided with cutaway portions therein and a ring on said lid having lugs designed to pass through the cutaway portions of said flange and to hold the pulsator element to the lid by relative rotation of said pulsator element and said ring.

13. In a milking machine, a pail lid, a pulsator element, a flange on said pulsator element with cutaway portions therein, ring on said lid, lugs on said ring for passing through said cutaway portions, and means whereby the rotation of said ring into locking relation with said flange will automatically draw said pulsator firmly into contact with said pail lid.

14. In a milking machine, a pail lid, a pulsator, a threaded ring rigidly mounted on said pail lid, a complementally threaded ring mounted on said first threaded ring, lugs on said second ring, a circular base member on said pulsator, a flange on said circular base member and having cutaway portions through which said lugs are designed to pass, said structure being such that after said lugs have passed through the cutaway portions of said circular members, rotation of said second ring will lock said pulsator to said lid and draw it tightly down thereon.

15. In a milking machine, a pail lid, a pulsator, a threaded ring rigidly mounted on said pail lid, said lid having an opening therethrough within said threaded ring, a complementally threaded ring mounted on said first threaded ring, lugs on said second ring, an open-bottom vacuum chamber designed to fit concentrically on said first ring and enclose the opening in said lid, a flange on the walls of said vacuum chamber and having cutaway portions through which said lugs are designed to pass, said structure being such that after said lugs have passed through the cutaway portions of said flange rotation of said second ring will both lock said chamber to said lid and draw it down into air-tight relation to said first-named ring.

16. In a milking machine, a slidable valve, a slidable rotatable valve, a fixed reciprocable member for operating one valve and controlling the operation of the other valve and means connecting the members for operating said valves.

17. In a milking machine, a slidable valve, a slidable rotatable valve and means of a resilient nature for directly connecting the members for operating said valves.

18. In a milking machine, a valve construction comprising two slidable valves, reciprocating piston heads, a member connected to the rod which connects the reciprocating piston heads for operating one of said valves, a trip arm for operating the other of said valves, and a tension spring connected to said member and said trip arm.

19. In a milking machine, a valve construction comprising two slidable valves, arm members for operating said valves, and resilient means directly connecting said members.

20. In a milking machine, a valve construction comprising two slidable valves, arm members for operating said valves, and means directly connecting said members whereby operation of one valve will operate the other.

21. In a milking machine, a valve construction comprising two slidable valves and reciprocatory and oscillatory arm members for operating said valves and resilient means connecting said members.

Signed at Columbus, Ohio, this 3rd day of September, 1924.

HENRY CLYDE ODEN.